Oct. 4, 1932. S. B. SMITH 1,881,330
INTERNAL COMBUSTION ENGINE
Filed Sept. 9, 1930
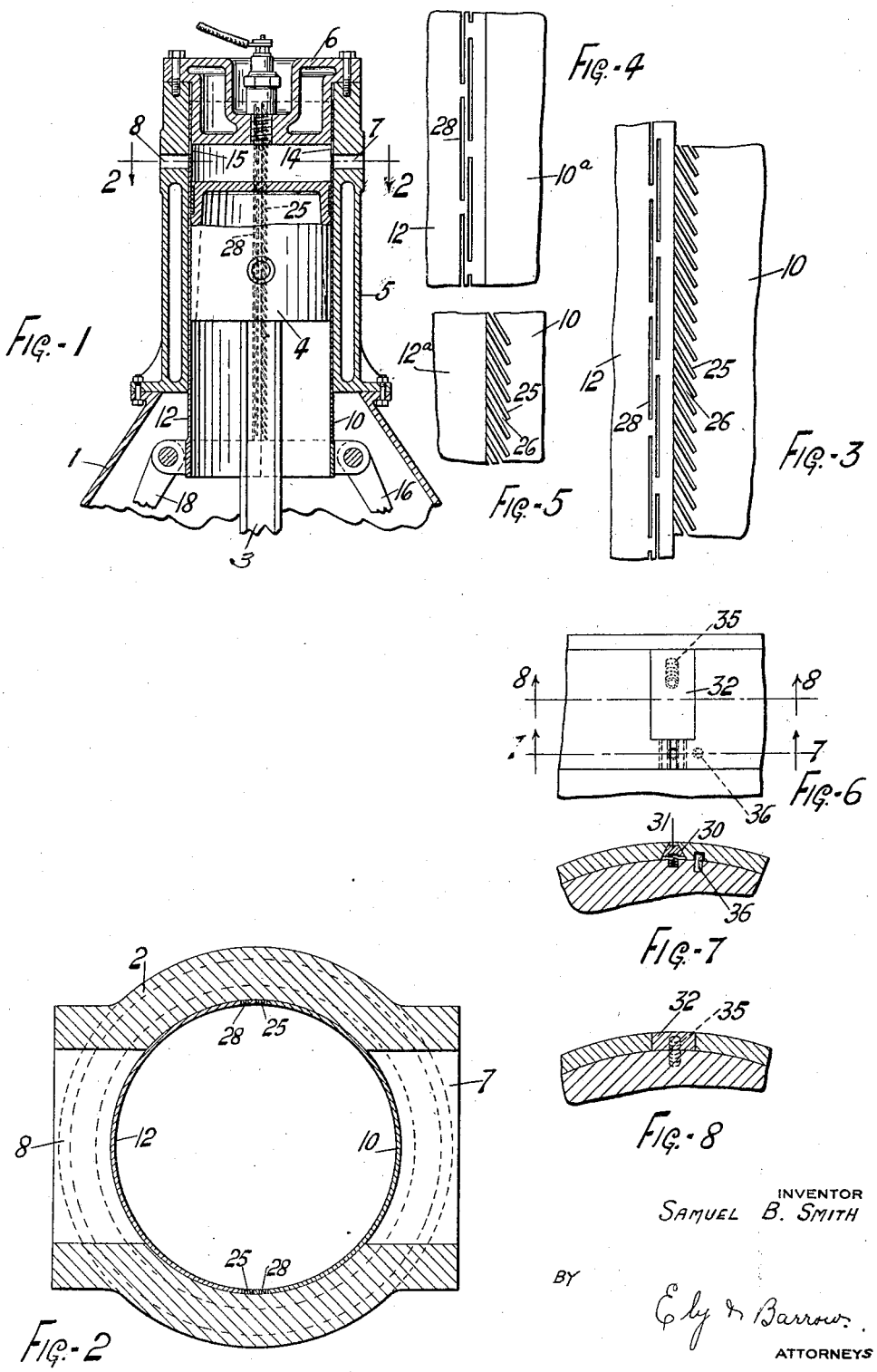
INVENTOR
SAMUEL B. SMITH
BY
Ely & Barrows
ATTORNEYS Patented Oct. 4, 1932

1,881,330

UNITED STATES PATENT OFFICE

SAMUEL B. SMITH, OF ROCKY RIVER, OHIO

INTERNAL COMBUSTION ENGINE

Application filed September 9, 1930. Serial No. 480,698.

This invention relates to the construction and operation of internal combustion engines, and particularly to that type of engine in which the inlet and exhaust ports are controlled by sliding valves. An engine of this type is provided with an outer cylinder having inlet and exhaust ports and a pair of semi-cylindrical sliding valve members adapted to control the ports, said valve members being actuated in timed relation to the compression and firing strokes of the piston.

In the particular form of the invention shown herein, the sliding valves are provided with ports adapted to be brought into register with the inlet and exhaust ports, and the engine is of the four-cycle type. It will be appreciated, however, that these details are shown and described solely for the purpose of illustrating the invention and are not to be taken as necessary to or limiting the invention.

In engines of the type referred to, it is customary to provide an inner cylinder with a ported sealing ring at the ports in order to seal the spaces about the sleeves or sliding valves. The object of the present invention, however, is to so design and construct the sliding valves or sleeves that the spaces between these parts will be sealed preferably by the members themselves, and it will not be necessary to provide any sealing rings or other devices for this purpose. Broadly considered, the invention comprises the provision of yielding or expansible edge portion in the sleeves, which by their mutual contact will afford the requisite seal along the contacting edges of the sleeves.

In the specific embodiment of the invention, the contacting edge portion of the sleeves are so constructed as to provide the necessary sealing medium for the spaces between the sleeves, being relieved at close intervals to give the necessary resilience between the sleeves.

It is a further object of the invention to provide a piston sealing ring of sufficient depth to seal the cut out portions in the sleeve valves when the ports in the valves are in register with and covered by the sealing ring.

It will be appreciated that the best known or preferred form of the invention has been shown, but it is not necessary or intended that the invention shall be limited to this form, as changes and modifications may be made, and other or equivalent means may be devised, all within the scope of the invention.

In the drawing in which specific embodiments of the invention have been shown and described:

Figure 1 is a vertical cross section through one of the cylinders of an internal combustion engine, it being understood that in a complete installation, as many of such units may be employed as found necessary or advisable;

Figure 2 is a section on the line 2—2 of Figure 1;

Figure 3 is an enlarged detail view of the mating or contacting edges of the valve members, showing the manner in which a double sealing effect may be secured;

Figure 4 is a view showing a single type of sealing means;

Figure 5 is a view showing another form thereof;

Figure 6 is a side elevation showing the piston sealing ring construction;

Figure 7 is a section on the line 7—7 of Figure 6; and

Figure 8 is a section on the line 8—8 of Figure 6.

The engine comprises the usual crank casing 1 in which is located the crank shaft not shown, having connected therewith the connecting rod 3 and piston 4, the latter operating in the cylinder 5. The cylinder is closed by the head 6, and is provided with the inlet port 7 and the oppositely located outlet port 8.

Between the piston and the cylinder are arranged the two substantially semi-cylindrical valves, the inlet valve sleeve being indicated by the numeral 10, and the outlet valve sleeve by the numeral 12. The sleeve 10 is provided at some distance below its upper edge with the port 14 adapted to be brought into register with the port 7, and the sleeve 12 is likewise provided with the port 15, to register with the port 8. These sleeves project above the inlet ports for a considerable distance, being received at their upper ends between the head and the cylinder.

The sleeve 10 is operated by a link 16, and the sleeve 12 by a link 18, these links being connected to any suitable operating mechanism by which the openings in the sleeves are brought into register with the ports 7 and 8 at the proper times. This means is not described, as it forms no part of the invention.

In order to seal the spaces between the sleeves, in engines of this type, it has been found necessary to provide an inside cylinder and complicated ported sealing ring systems, but with the use of the principles of the invention herein shown and described, the necessity for such sealing means is obviated. The invention contemplates the use of an elastic or expansible edge contact between the edges of the sleeves, whereby the expansion of the edge portions gives the requisite compression along these surfaces to secure the sealing effect.

While numerous expansible devices may be employed for this purpose, the form shown and described illustrates the formation of expansible edge contact portions formed as a part of the individual sleeves, but any sealing means may be employed either as a part of the sleeves or separate therefrom. The sealing device may be in the form of a strip lying alongside of or adjacent the edge of the valve.

Taking for example, the form shown in Figures 1 and 3, the sleeve 10 is formed along its vertical edges with a series of notches or recesses 25, which form a series of teeth or fins 26 presenting their end portions to the adjacent edge of the sleeve 12. These notches are preferably formed in an upwardly extending direction so that any downward movement of the sleeve 12 with respect to the sleeve 10, will tend to force the teeth against the edge of the sleeve 12. The compression within the firing chamber will also cause a similar tightening of the contact. The sleeve 12 is also provided with a somewhat yielding edge portion by the formation of slots 28 therein, these slots being formed in staggered relation, or so as to break joint, and yet not permitting the escape of pressure through the slots. These slots are of less depth than the sealing ring to be described so that no pressure can escape through a slot around the sealing ring.

In the assembly of the engine, the sleeves 10 and 12 are each slightly larger than one-half of the total circumference of the space in which they are to be received, so that it is required that the sleeves be compressed somewhat in assembling, whereby the edge contact portion of the sleeves are compressed sufficiently to give the requisite sealing effect.

As shown, it is not necessary that both the toothed or notched sleeve and the slotted sleeve be employed in conjunction. Thus in Figure 4 the edge of the sleeve 10ª is solid while the sleeve 12 is provided with the slots which give a desirable degree of compression along the edge contact portion. In Figure 5, the sleeve 10 only is provided with the yielding edge portion while the sleeve 12ª is solid.

The sealing ring for the piston is of sufficient depth to prevent any leakage about either of the cut out portions of the sleeves 10 or 12. This construction is necessary as the ports in the sleeves will register with and be covered by the sealing ring at the times when the sleeves are at or near their lowermost positions. It may be of special construction and design, such as shown and described more fully in my copending application Serial No. 479,519, filed September 3, 1930. It is provided with the single split in which there is the V-shaped or converging recess 30 in which is located the spring pressed wedge block 31, which serves to expand the ring in addition to its natural expansive qualities. To seal the spaces about the wedge block, a second block 32 is employed which overlaps the block 31, being forced to its seat and outwardly of the ring by the diagonal spring 35. A locating pin 36 secures the ring against rotation.

It will be observed that a very effective and efficient sealing device has been provided which forms an expansible, yielding contact between the contacting edge portions of the sliding sleeve valves. No other sealing means is required, and the operation of the engine and its maintenance and design is thereby simplified and perfected. There are many forms in which the invention may be adopted, and it is the intention that the claims shall be broadly construed within their fair scope and meaning to cover such modifications or alterations as fall within the fair scope of the invention. The form of valve may be altered and other changes and variations made.

What is claimed is:

1. In an internal combustion engine, the combination with a ported cylinder and piston, of a pair of sliding arcuate valves, adapted to control the ports, the valves having edge portions in sliding contact, and expansible formations on said edge portions of the valves to seal the space between said valves.

2. In an internal combustion engine, the combination with a cylinder and piston, of a pair of sliding arcuate sleeve valves having their edges in mutual contact, and yielding formations in the edge portions adapted by expansion to form a seal along the edges of the valves.

3. In an internal combustion engine, the combination with a cylinder and piston, of a sliding arcuate valve, said valve having along an edge portion thereof a yielding, sealing formation adapted to expand to seal the space along the edge of the valve.

4. In an internal combustion engine, a sliding arcuate valve having the metal along its edge removed at intervals to provide a yielding edge upon the valve in combination with a second sliding arcuate valve, the edges of the valves being in contact and compressed.

5. The combination of two sliding arcuate valves in edge contact and under compression, the edge portion of one of said valves being relieved at intervals to provide a compressible, yielding sealing means for the space between the edges of the valves.

6. The combination of two sliding arcuate valves in edge contact, the edge portion of one of said valves being relieved at intervals to provide a compressible, yielding sealing means for the space between the edges of the valves.

7. The combination of two sliding arcuate valves in edge contact and under compression, the edge portions of said valves being relieved at intervals to provide a compressible, yielding sealing means for the space between the edges of the valves.

8. The combination of two sliding arcuate valves in edge contact, the edge portions of said valves being relieved at intervals to provide a compressible, yielding sealing means for the space between the edges of the valves.

9. In an engine of the type described, a pair of arcuate, reciprocating valve sleeves, and resilient sealing means along the edges of the valves.

10. In an engine of the type described, a pair of arcuate, reciprocating valve sleeves, and compressed, expansible sealing means along the edges of the valves.

11. In an engine of the type described, the combination of an arcuate, reciprocating valve sleeve, the sleeve being relieved to provide a resilient edge portion, in combination with a sealing ring over which the sleeve is movable, said sealing ring blocking the loss of pressure through the relieved portion of the sleeve.

12. In an engine of the type described, the combination of an arcuate reciprocating valve sleeve, the edge of the sleeve being provided with slots to afford a resilient sealing medium, in combination with a piston movable relatively to the sleeve, and a sealing ring on the piston of greater depth than a slot to block the loss of pressure through the slotted portion of the sleeve.

13. In an engine of the type described, the combination of an arcuate reciprocating valve sleeve, the sleeve being cut out to afford a resilient sealing edge portion, in combination with an expansible sealing ring in contact with the valve sleeve, and of sufficient depth to prevent loss of pressure through the cut out portion of the valve sleeve.

14. In an engine of the type described, the combination of a cylinder having a port therein, a piston within the cylinder and a sliding valve controlling the port and movable between the piston and the cylinder, the valve being cut out at intervals, and a sealing ring upon the piston and in contact with the valve, said ring being of greater depth than a cut out in the valve.

SAMUEL B. SMITH.